(12) United States Patent
Hausl et al.

(10) Patent No.: US 11,228,378 B2
(45) Date of Patent: Jan. 18, 2022

(54) METHOD AND SYSTEM FOR ESTIMATING A TRANSMISSION DIRECTION OF A TRANSMITTER

(71) Applicant: Rohde & Schwarz GmbH & Co. KG, Munich (DE)

(72) Inventors: Christoph Hausl, Munich (DE); Julian Emmert, Munich (DE); Nurettin Turan, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 23 days.

(21) Appl. No.: 16/839,494

(22) Filed: Apr. 3, 2020

(65) Prior Publication Data

US 2021/0314074 A1 Oct. 7, 2021

(51) Int. Cl.
*H04W 24/00* (2009.01)
*H04B 17/10* (2015.01)
*H04B 7/005* (2006.01)

(52) U.S. Cl.
CPC ........... *H04B 17/104* (2015.01); *H04B 7/005* (2013.01); *H04W 24/00* (2013.01)

(58) Field of Classification Search
CPC ..... H04B 17/104; H04B 7/005; H04W 24/00; H04W 24/06; H04W 24/08; H04W 64/00; H04W 84/047; H04W 88/02; H04W 88/08
See application file for complete search history.

(56) References Cited

U.S. PATENT DOCUMENTS

| | | | |
|---|---|---|---|
| 2006/0194553 A1* | 8/2006 | Ozaki | H04B 17/15 455/226.1 |
| 2009/0215443 A1 | 8/2009 | Dickey et al. | |
| 2015/0304869 A1 | 10/2015 | Johnson et al. | |
| 2017/0208524 A1* | 7/2017 | Fukui | H04W 36/38 |
| 2020/0145855 A1* | 5/2020 | Hahn | H04W 4/40 |

* cited by examiner

*Primary Examiner* — Thanh C Le
(74) *Attorney, Agent, or Firm* — Christensen O'Connor Johnson Kindness PLLC

(57) ABSTRACT

The present disclosure relates to a method of estimating a transmission direction of a transmitter. The method comprises: performing a first measurement by means of a measurement system, thereby obtaining a first measurement value of a first transmitter; performing a second measurement by means of the measurement system, thereby obtaining a second measurement value of a second transmitter; obtaining position information of the first transmitter and the second transmitter; determining a position of the measurement system; and taking the first measurement value, the second measurement value, the position information as well as the position of the measurement system into account in order to estimate the transmission direction of the first transmitter. In addition, a system for estimating a transmission direction of a transmitter is described.

20 Claims, 1 Drawing Sheet

METHOD AND SYSTEM FOR ESTIMATING A TRANSMISSION DIRECTION OF A TRANSMITTER

FIELD OF THE DISCLOSURE

Embodiments of the present disclosure generally relate to a method of estimating a transmission direction of a transmitter. Further, embodiments of the present disclosure relate to a system for estimating a transmission direction of a transmitter.

BACKGROUND

In the state of the art, it is known to analyze cellular networks or mobile networks based on a drive test scanner. The respective scanner is moved through an area of interest with the aim to find network cells, namely transmitters, in the wireless spectrum, and to obtain respective measurement values for analysis, for instance a receive power of the respective cells. Typically, three cells or rather transmitters assigned to one frequency band are mounted on a single tower wherein each of these cells is equipped with a directional antenna that covers an angular range of 120°, particularly a 120° azimuth sector. Accordingly, the transmitters together cover 360°.

Currently known solutions estimate the transmission direction of a respective cell based on measurement values of the respective cell to be investigated. For example, the solutions known in the state of the art chose the direction with the maximum receive power from all measurement results obtained for the respective transmitter.

However, the respective measurements can be influenced or rather affected by objects or obstacles in the measurement area that have a shadowing effect on the signals transmitted by the transmitter or rather cell to be investigated. For instance, large buildings may shadow the respective transmitters depending on the measurement direction.

SUMMARY

Accordingly, there is a need for a simple and cost-efficient way to estimate the transmission direction of a transmitter with high accuracy.

The present disclosure provides a method of estimating a transmission direction of a transmitter. In an embodiment, the method comprises the steps of:

performing a first measurement by means of a measurement system, thereby obtaining a first measurement value of a first transmitter;

performing a second measurement by means of the measurement system, thereby obtaining a second measurement value of a second transmitter;

obtaining position information of the first transmitter and the second transmitter;

determining a position of the measurement system; and taking the first measurement value, the second measurement value, the position information as well as the position of the measurement system into account in order to estimate the transmission direction of the first transmitter.

Further, the present disclosure provides a system for estimation a transmission direction of a transmitter. In an embodiment, the system comprises a measurement circuit or module, a position circuit or module, and an analysis circuit or module. The measurement module is configured to gather measurement values of a first transmitter and a second transmitter, and to forward these measurement values to the analysis module. The position module, for instance a global navigation satellite system circuit or module, is configured to gather a position of the measurement system itself and to forward the position to the analysis module. The analysis module is configured to obtain position information of the first transmitter and the second transmitter and to estimate the transmission direction of the first transmitter based on the first measurement value, the second measurement value, the position information as well as the position of the measurement system.

Accordingly, the present disclosure is based on the finding that the transmission direction of the transmitter of interest is estimated based on the measurement results for this respective transmitter as well as at least one further transmitter that is located in proximity to the transmitter of interest. Thus, measurement values assigned to different transmitters are taken into consideration in order to determine the transmission direction of a single transmitter, namely the first transmitter, more accurately.

Since at least two different measurement values associated with different transmitters are taken into consideration, a possible shadowing of the signals transmitted can be cancelled out effectively. In other words, such shadowing is compensated appropriately as it is assumed that the shadowing effects the signals transmitted by both transmitters in a similar manner.

Generally, this increases the robustness of the method as well as the accuracy of the system.

Besides the measurement values obtained, the position information of the respective transmitters as well as the position of the measurement system itself are also taken into consideration such that the transmission direction can be estimated appropriately.

Accordingly, it is possible to obtain accurate estimates about the respective transmission direction of the transmitter of interest while taking measurement values into account that may be recorded during a drive test. The drive test may be performed by the measurement system, wherein the measurement system is associated to a movable object, for instance a vehicle or an unmanned aerial vehicle (UAV) like a drone that may be remote-controlled.

The first transmitter and the second transmitter may relate to co-located transmitters that are associated with a sector antenna. In some embodiments, a sector antenna is a type of directional antenna with a sector-shaped radiation pattern. Thus, the term sector is used in the geometric sense.

Generally, each of the transmitters may comprise an antenna, for example a segmented antenna, as well as a remote radio head. The remote radio head (RRH), also called remote radio unit (RRU), is a remote radio transceiver used in wireless networks.

An aspect provides that a ratio or a difference is determined that is based on the first measurement value and the second measurement value, wherein the ratio or the difference is used to estimate the transmission direction of the first transmitter. In some embodiments, the measurement values obtained that are associated with the different transmitters may be subtracted from each other in a certain way in order to obtain a difference.

In some embodiments, a difference metric may be provided, wherein the respective transmission direction is obtained by the maximum metric.

In a similar manner, the respective measurement values associated with the different transmitters may be used by dividing the measurement values in a certain way in order to obtain a ratio.

Hence, a ratio metric may be provided, wherein the respective transmission direction is obtained by the maximum metric.

Furthermore, a model may be used, wherein the measurement values obtained are evaluated in order to identify the best fit of the measurement values with regard to the model applied for estimating the transmission direction of the first transmitter, namely the transmitter of interest. In other words, an optimization metric may be provided wherein the transmission direction is selected such that the best fit of the measurement values obtained with regard to the model applied is achieved.

This can be done by a least-squares method or any other optimization process known. The model applied may be based on typical parameters of an antenna, for instance beam width, and typical wireless channel parameters. Thus, the model applied takes the measurement values obtained into account in order to estimate the transmission direction of the first transmitter, namely the transmitter of interest.

Moreover, an artificial intelligence may be used to estimate the transmission direction of the first transmitter, wherein the artificial intelligence was trained by training data comprising measurement values of transmitters with known transmission direction. The artificial intelligence receives the measurement values in order to output the estimated transmission direction of the first transmitter, namely the transmitter of interest. Accordingly, the transmission direction of the first transmitter is estimated based on an artificial intelligence that was trained previously with training data. For instance, the artificial intelligence may relate to a trained machine-learning algorithm.

In general, the respective steps mentioned above for estimating the transmission direction, for example the ratio metric, the difference metric, the optimization metric associated with the model applied, and/or the artificial intelligence may be used solely or in any combination in order to improve the accuracy of the estimation.

According to another aspect, several measurements are performed such that the first measurement value and/or the second measurement value are/is determined several times from different measurement directions. Therefore, the respective metric can be generated in an appropriate manner. Hence, enough measurement data is provided for the artificial intelligence or rather the model used for estimating the transmission direction. For instance, the first measurement value associated with the first transmitter is measured several times from several measurement directions, wherein the same applies for the second transmitter that is also measured several times from different measurement directions (as well as further transmitters). Accordingly, the estimation of the transmission direction is not only based on the maximum receive power measurements of the transmitter of interest.

In some embodiments, a metric is generated based on the results of the several measurements performed from the different measurement directions. As discussed above, the metric may relate to the difference metric, the ratio metric and/or the optimization metric.

For instance, the first measurement value and the second measurement value comprise at least one of the receive power, a signal-to-interference-noise ratio (SINR), a receive-quality indicator, a delay spread or any combination thereof. Thus, the respective measurement value may relate to at least one value directly measured, a value derived from a measurement value or rather a combination thereof.

The SINR is a quantity used to give theoretical upper bounds on channel capacity (or the rate of information transfer) in wireless communication systems such as networks. The receive-quality indicator is an indicator derived from the receive power measured. The delay spread is a measure of the multipath richness of a communications channel.

In addition, the position information may be obtained from a database or from an estimation result provided by a position-estimation circuit or module. The database may be provided by an internal storage medium of the measurement system or an external data store that can be accessed by the measurement system.

Furthermore, the position information of the respective transmitters may be estimated by a position-estimator module that may rely on image analysis or other known techniques.

Another aspect provides that the position information of the first transmitter and the position information of the second transmitter are substantially identical since the first transmitter and the second transmitter are co-located. As mentioned above, the respective transmitters may be co-located transmitters such that the respective antennas relate to sector antennas. For instance, the transmitters are located on a single tower, wherein the respective transmitters cover a certain angular sector, for instance a 120° azimuth sector.

According to another embodiment, the position information and the position of the measurement system each comprise geographic position information. Accordingly, the respective information can be processed appropriately by the measurement system, for example the analysis module.

Another aspect provides that the position of the measurement system is determined by a global navigation satellite system (GNSS) circuit or module. The position module may be established by the global navigation satellite system circuit or module, for instance a global positioning system (GPS) circuit or module. Therefore, the geographic position information of the measurement system itself can be determined easily. The GNSS module may be integrated within the measurement system.

Alternatively, a separate GNSS module may be provided that is connected with the analysis module in order to forward the respective position information to the analysis module for further processing.

Another aspect provides that the transmission direction is estimated with regard to azimuth and/or elevation. Thus, the azimuth transmission direction, the elevation transmission direction or both directions may be estimated. The elevation transmission direction may be estimated by an unmanned aerial vehicle such as a drone easily that can move in the respective direction in order to obtain measurement values that permit to estimate the elevation transmission direction. The transmission direction with regard to azimuth can be estimated by a vehicle like a car investigating the area of interest.

According to another aspect, the measurement values are filtered and interpolated over an angular measurement range. This may be done in a pre-processing step such that the respective measurement values gathered are filtered and interpolated prior to estimating the respective transmission direction. For instance, large angular ranges covered by the respective measurements can be filled with nulls or constant values prior to the interpolation in order to simplify the respective interpolation. In addition, the filtering can cancel artefacts or other false measurement values.

Moreover, a path-loss compensation may be applied on the measurement values. The path-loss compensation may also relate to a pre-processing step that is performed prior to estimating the transmission direction. In some embodiments, the path-loss compensation may be done for each measurement value obtained. The path loss to be compensated may also be estimated based on the respective position information and/or position of the measurement system that can be used to determine the respective distances. In some embodiments, measurements from a far distance can be scaled appropriately such that they appear to be made close to the transmitters. This contributes to a more accurate measurement and, therefore, an improved estimation of the transmission direction.

Another aspect provides that a joint estimation of the respective transmission direction is performed for the first transmitter and the second transmitter. Thus, the transmission directions of two or more transmitters may be estimated simultaneously by the joint estimation. In some embodiments, the joint estimation may be done for all transmitters, for example all co-located transmitters. In the joint estimation, a limited number of possibilities for the transmission direction distances is provided and considered since the respective position information of the transmitters is taken into account (a priori knowledge). Put differently, the transmission direction distance is regarded as an additional optimization parameter.

Moreover, a probability-density function is taken into consideration for the respective estimation. The probability-density function corresponds to a-priori information about the transmission direction(s).

Further, a confidence interval may be calculated for the respective estimation. The confidence interval defines an angular range where the transmission direction shall be assigned to with a specific probability. For instance, bad measurements will have a confidence interval about +/−180° whereas good measurements will have a confidence interval lower than +/−180°, for example lower than +/−120°, for instance about +/−30°.

In general, the measurement system is configured to perform embodiments of the method described above.

Accordingly, the analysis module may be configured to:

determine a ratio or a difference that is based on the first measurement value and the second measurement value;

apply a model that is used to identify a best fit of the measurement values with regard to the model applied; and/or use an artificial intelligence that was trained by training data comprising measurement values of transmitters with known transmission direction, wherein the artificial intelligence receives the measurement values in order to output the estimated transmission direction of the first transmitter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
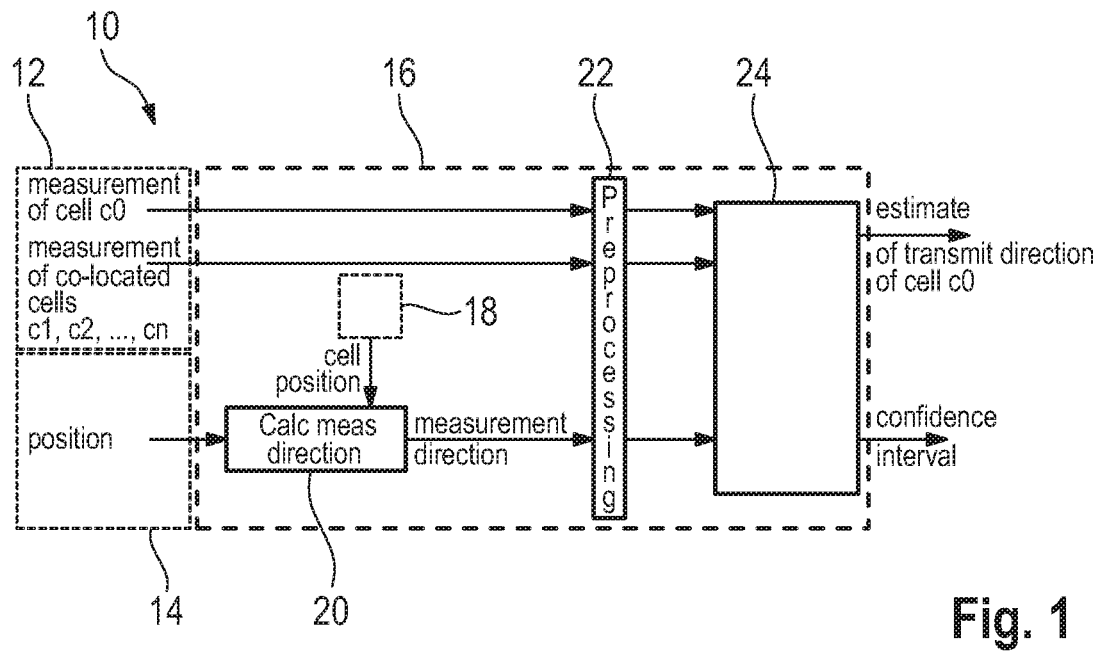
FIG. 1 schematically shows a measurement system according to an embodiment of the present disclosure.

FIG. 1 shows a system 10 for estimating a transmission direction of a transmitter. The system 10 comprises a measurement circuit or module 12, a position circuit or module 14 as well as an analysis circuit or module 16. As shown in FIG. 1, the measurement module 12 as well as the position module 14 are connected with the analysis module 16.

Figure 2:
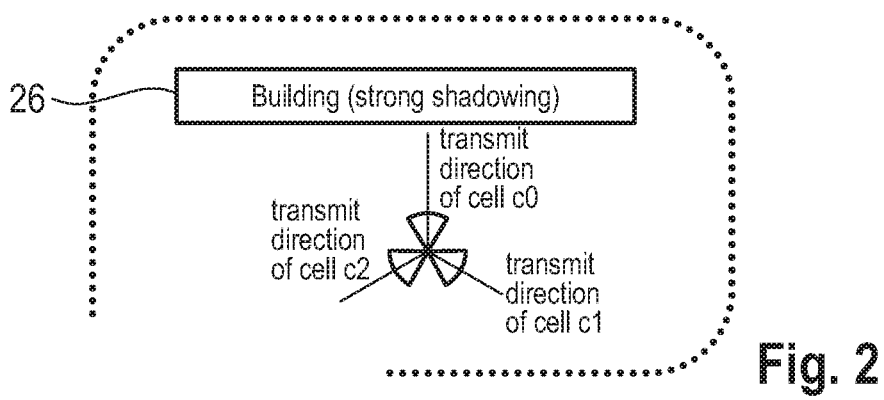
FIG. 2 schematically shows an overview illustrating a representative method of estimating a transmission direction of a transmitter.

The measurement module 12 gathers measurement values of a first transmitter, labelled with cell c0, and at least a second transmitter that is labelled with cell c1. In the shown embodiment, the measurement module 12 gathers measurement values of several transmitters, namely cells c1 to cn. The respective transmitters are co-located which means that the respective transmitters may be located at a common tower as shown in FIG. 2.

The position module 14 gathers a position of the system 10 itself. For instance, the position module 14 is established by a global navigation satellite system (GNSS) module such as a global positioning system (GPS) module. The respective position of the measurement system 10 gathered is forwarded to the analysis module 16 as shown in FIG. 1. The position concerns to geographic position information.

The analysis module 16 may comprise an internal storage 18 that provides an internal database comprising position information of the respective transmitters, namely geographic position information of the transmitters. Alternatively, the database may be provided on an external device or data store that can be accessed by the system 10 or rather the analysis module 16.

In a further alternative embodiment, the position information of the transmitters is provided by a position-estimation circuit or module that may be integrated in the system 10 or rather an external one. The position-estimation module may use image analysis techniques in order to estimate the respective positions of the transmitters.

In any case, the position information of the transmitters as well as the position of the system 10 correspond to geographic position information that can be processed by the analysis module 16, for example an internal calculation circuit or unit 20. The calculation unit 20 takes the position information as well as the position into account in order to calculate the measurement direction of the system 10, for example the measurement module 12, with respect to the transmitters.

In addition, the analysis module 16 has a pre-processing circuit or unit 22 that receives the respective measurement values as well as the measurement direction calculated by the calculation unit 20. In the pre-processing unit 22, the measurement values gathered may be filtered and interpolated over an angular measurement range. Thus, empty portions of the entire angular range to be investigated may be filled with appropriate values prior to the interpolation in order to simplify the interpolation appropriately. Furthermore, false measurement values or rather artefacts may be filtered such that they do not disturb the interpolation process.

In addition, the pre-processing unit 22 may perform a path-loss compensation for the respective measurement values. Hence, the respective path loss to be compensated is determined based on the information obtained with regard to the position of the system 10 and the position information of the transmitters, for example the respective measurement direction calculated previously, as well as the measurement values gathered by the measurement module 12.

The path loss compensation scales the measurement values obtained from a far distance such that they appear to be made close to the transmitters. Therefore, more accurate measurement results are obtained, resulting in an improved estimation of the transmission direction of the transmitter of interest.

However, the pre-processing unit 22 is an optional one such that the respective pre-processing steps performed by the pre-processing unit 22 are also only optional.

The (pre-processed) measurement values as well as the measurement direction calculated is forwarded to an estimation circuit or unit 24 of the analysis module 16 that calculates the transmission direction of the first transmitter that is of interest, namely cell c0.

Hereinafter, the respective estimation process is described in more detail while referring to FIGS. 2 and 3 that illustrate the method of estimating the transmission direction of the transmitter in more detail.

In FIG. 2, a typical scenario is shown that illustrates that three different transmitters (labelled with cell c0, cell c1 and cell c2) are located on a single tower, wherein these transmitters correspond to co-located transmitters covering a certain azimuth sector each. In addition, a building 26 is provided that causes a strong shadowing depending on the respective measurement direction of the measurement system 10.

In FIG. 2, several measurement points at which a respective measurement of the three transmitters is performed, are shown in FIG. 2 by the respective dots. It can be derived from FIG. 2 that several measurements will be strongly affected by the shadowing.

Accordingly, at each of the different measurement positions, the respective measurement value has been gathered by the measurement module 12. In addition, the position of the system 10 has also been measured at the respective measurement position(s).

For instance, the receive power of the respective transmitters has been measured such that the respective measurement values correspond to receive power.

Since the respective measurement value(s) has/have been measured several times, for instance k times, the respective receive power values, namely the measurement values, can be denoted by Pjk, wherein j corresponds to the respective transmitter j, namely cell cj. Based on these values, a respective metric can be generated as will be described later in more detail when referring to FIG. 3.

Generally, the respective measurement values correspond to receive power, signal-to-interference-noise ratio, receive-quality indicator, delay-spread or any combination thereof.

Figure 3:
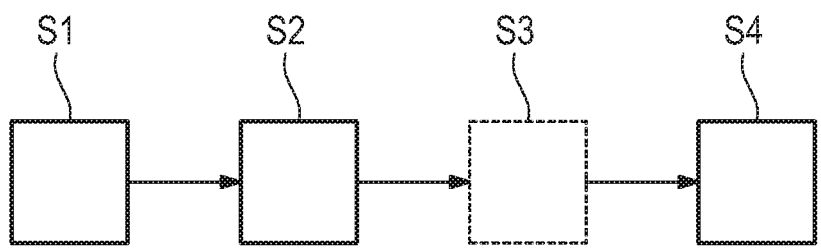
FIG. 3 shows a representative flow-chart illustrating the method of estimating a transmission direction of a transmitter.

When referring to FIG. 3, several measurement values of the respective transmitters as well as the corresponding positions of the system 10 are gathered in a first step S1.

In a second step S2, the measurement direction is calculated by the calculation unit 20 that takes the position of the system 10 as well as the position information of the transmitters into account that may be derived from a database or obtained from a position-estimator module as described above.

In a third step S3 that is optional, a pre-processing of the respective measurement values may take place by the pre-processing unit 22. For instance, a path-loss compensation and/or a filtering and interpolation of the respective measurement values is done.

In a fourth step S4, the (pre-processed) measurement values as well as the measurement direction are forwarded to the estimation unit 24 that calculates the transmission direction of the first transmitter, namely the transmitter of interest that is labelled by cell c0.

In some embodiments, the estimation unit 24 may performs an optimization of a metric that comprises the comparison of the measurement values of the different transmitters.

For instance, a receive-power difference may be calculated for each measurement direction (labelled by "k"), wherein a difference metric is generated based on the receive-power differences. Then, the transmission direction of the first transmitter is estimated based on the measurement direction having the maximum metric.

The respective receive-power difference may be calculated as follows:

$$P_{0,k} - \left(\frac{P_{1,k}}{a_1} + \frac{P_{2,k}}{a_2} \ldots + \frac{P_{n,k}}{a_n}\right),$$

wherein the parameters $a_1$ to $a_n$ are constant scaling parameters, and wherein $P_{0,k}$ corresponds to the measurement value for the first transmitter, namely the one of interest.

Alternatively or additionally, a receive-power ratio may be calculated for each measurement direction (labelled by "k"), wherein a ratio metric is generated based on the receive-power ratios. Then, the transmission direction of the first transmitter is estimated based on the measurement direction having the maximum metric.

The respective receive-power ratio may be calculated as follows:

$$\frac{P_{0,k}}{\frac{P_{1,k}}{a_1} + \frac{P_{2,k}}{a_2} \ldots + \frac{P_{n,k}}{a_n} + a_0},$$

wherein the parameters $a_0$ to $a_n$ are constant scaling parameters, and wherein $P_{0,k}$ corresponds to the measurement value for the first transmitter, namely the one of interest.

Alternatively or additionally, the estimation unit 24 may use a model wherein the respective measurement values of the different transmitters are evaluated in order to identify a best fit of the measurement values with regard to the model applied.

Alternatively or additionally, an artificial intelligence is used by the estimation unit 24, wherein the artificial intelligence was trained previously by training data that comprises measurement values of transmitters with known transmission direction. Thus, the trained artificial intelligence receives the (pre-processed) measurement values of the different transmitters in order to output the estimated transmission direction of the first transmitter.

Accordingly, the transmission direction may be estimated by one or any combination of the above-mentioned methods.

Furthermore, known methods may also be combined with any of the above-mentioned methods, for instance an additional power-metric-approach that only takes the receive power of the transmitter of interest into account and/or a naïve approach that only outputs the maximum receive power without any pre-calculation or rather pre-processing.

Moreover, the estimation unit 24 may further perform a joint estimation of the transmission directions for several transmitters simultaneously, for example all transmitters.

In addition, the estimation unit 24 may be used to consider a-priori information about the transmission direction in form of a probability-density function for estimating the transmission direction(s) more accurately.

In addition, the estimation unit 24 may also calculate a confidence interval for the respective transmission direction. Thus, it can be also outputted whether or not the transmission direction estimated is a good estimate or not. In some embodiments, bad measurements may have a confidence interval about +/−180°, whereas good measurements will have a confidence interval about +/−30°.

Accordingly, the system as well as the method use measurement values of more than the transmitter of interest in order to calculate or rather estimate the transmission direction of the respective transmitter of interest.

In some embodiments, the transmission direction may relate to an azimuth transmission direction or rather an elevation transmission direction. Moreover, a combination of both directions may be estimated appropriately.

The azimuth transmission direction can be estimated by a vehicle driving in the area of interest. The elevation transmission direction can be estimated by a drone or any other flying object.

Since the measurement values of several transmitters are taken into consideration, the accuracy of the estimation is improved.

Certain embodiments disclosed herein utilize circuitry (e.g., one or more circuits) in order to implement standards, protocols, methodologies or technologies disclosed herein, operably couple two or more components, generate information, process information, analyze information, calculate information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of estimating a transmission direction of a transmitter, comprising:
    performing a first measurement by a measurement system, thereby obtaining a first measurement value of a first transmitter;
    performing a second measurement by the measurement system, thereby obtaining a second measurement value of a second transmitter;
    obtaining position information of the first transmitter and the second transmitter,
    determining a position of the measurement system; and
    taking the first measurement value, the second measurement value, the position information as well as the position of the measurement system into account in order to estimate the transmission direction of the first transmitter such that at least two different measurement values associated with different transmitters are taken into consideration.

2. The method according to claim 1, wherein a ratio or a difference is determined that is based on the first measurement value and the second measurement value, and wherein the ratio or the difference is used to estimate the transmission direction of the first transmitter.

3. The method according to claim 1, wherein a model is used, and wherein the measurement values obtained are evaluated in order to identify a best fit of the measurement values with regard to the model applied for estimating the transmission direction of the first transmitter.

4. The method according to claim 1, wherein an artificial intelligence is used to estimate the transmission direction of the first transmitter, wherein the artificial intelligence was trained by training data comprising measurement values of transmitters with known transmission direction, and wherein the artificial intelligence receives the measurement values in order to output the estimated transmission direction of the first transmitter.

5. The method according to claim 1, wherein several measurements are performed such that at least one of the first measurement value and the second measurement value are/is determined several times from different measurement directions.

6. The method according to claim 5, wherein a metric is generated based on the results of the several measurements performed from the different measurement directions.

7. The method according to claim 1, wherein the first measurement value and the second measurement value comprise at least one of a receive-power, a signal-to-interference-noise ratio, a receive-quality indicator, a delay-spread or any combination thereof.

8. The method according to claim 1, wherein the position information is obtained from a database or from an estimation result provided by a position-estimation circuit.

9. The method according to claim 1, wherein the position information of the first transmitter and the position information of the second transmitter are substantially identical since the first transmitter and the second transmitter are co-located.

10. The method according to claim 1, wherein the position information and the position of the measurement system each comprise geographic position information.

11. The method according to claim 1, wherein the position of the measurement system is determined by a global navigation satellite system (GNSS) module.

12. The method according to claim 1, wherein the transmission direction is estimated with regard to at least one of azimuth and elevation.

13. The method according to claim 1, wherein the measurement values are filtered and interpolated over an angular measurement range.

14. The method according to claim 1, wherein a path loss compensation is applied on the measurement values.

15. The method according to claim 1, wherein a joint estimation of the respective transmission direction is performed for the first transmitter and the second transmitter.

16. The method according to claim 1, wherein a probability-density function is taken into consideration for the respective estimation.

17. The method according to claim 1, wherein a confidence interval is calculated for the respective estimation.

18. A system for estimating a transmission direction of a transmitter, the system comprising:
a measurement circuit;
a position circuit; and
an analysis circuit,
wherein the measurement circuit is configured to gather measurement values of a first transmitter and a second transmitter and to forward these measurement values to the analysis circuit such that at least two different measurement values associated with different transmitters are taken into consideration,
wherein the position circuit is configured to gather a position of the measurement system itself and to forward the position to the analysis circuit, and
wherein the analysis circuit is configured to obtain position information of the first transmitter and the second transmitter and to estimate the transmission direction of the first transmitter based on the first measurement value, the second measurement value, the position information as well as the position of the measurement system.

19. The system according to claim 18, wherein the analysis circuit is configured to:
determine a ratio or a difference that is based on the first measurement value and the second measurement value;
apply a model that is used to identify a best fit of the measurement values with regard to the model applied; and/or
use an artificial intelligence that was trained by training data comprising measurement values of transmitters with known transmission direction, wherein the artificial intelligence receives the measurement values in order to output the estimated transmission direction of the first transmitter.

20. A method of estimating a transmission direction of a transmitter, comprising:
performing a first measurement by a measurement system, thereby obtaining a first measurement value of a first transmitter;
performing a second measurement by means of the measurement system, thereby obtaining a second measurement value of a second transmitter;
obtaining position information of the first transmitter and the second transmitter;
determining a position of the measurement system; and
taking the first measurement value, the second measurement value, the position information as well as the position of the measurement system into account in order to estimate the transmission direction of the first transmitter such that a possible shadowing of the signals transmitted is cancelled out effectively.

* * * * *